US011967993B2

(12) United States Patent
Tanaka et al.

(10) Patent No.: US 11,967,993 B2
(45) Date of Patent: Apr. 23, 2024

(54) COMMUNICATION APPARATUS

(71) Applicant: Nippon Telegraph and Telephone Corporation, Tokyo (JP)

(72) Inventors: Toshimitsu Tanaka, Musashino (JP); Naoki Hanaoka, Musashino (JP); Toshihiro Hayashi, Musashino (JP); Hiroya Minami, Musashino (JP); Hidetoshi Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 69 days.

(21) Appl. No.: 17/773,196

(22) PCT Filed: Oct. 31, 2019

(86) PCT No.: PCT/JP2019/042886
§ 371 (c)(1),
(2) Date: Apr. 29, 2022

(87) PCT Pub. No.: WO2021/084709
PCT Pub. Date: May 6, 2021

(65) Prior Publication Data
US 2022/0376791 A1 Nov. 24, 2022

(51) Int. Cl.
*H04B 10/27* (2013.01)
*H04L 12/10* (2006.01)

(52) U.S. Cl.
CPC ............. *H04B 10/27* (2013.01); *H04L 12/10* (2013.01)

(58) Field of Classification Search
CPC .................................. H04B 10/27; H04L 12/10

USPC ........................................................ 398/140
See application file for complete search history.

(56) References Cited

U.S. PATENT DOCUMENTS

| 2011/0077793 A1* | 3/2011 | Hsieh | H04L 12/10 |
| | | | 700/297 |
| 2013/0132576 A1 | 5/2013 | Haba et al. | |
| 2014/0314412 A1* | 10/2014 | Soto | H04B 10/272 |
| | | | 398/67 |
| 2014/0369687 A1* | 12/2014 | Jain | H04B 10/27 |
| | | | 307/42 |

FOREIGN PATENT DOCUMENTS

| JP | 2013110627 | 6/2013 |
| JP | 2013201543 | 10/2013 |
| JP | 2014207593 | 10/2014 |

OTHER PUBLICATIONS

Nippon Telegraph and Telephone West Corporation, "Requirement specifications for small ONU compatible terminals Version 1.0," NTT West Home Page, May 31, 2019, retrieved from URL <https://www.ntt-west.co.jp/business/service/onu/pdf/interface.pdf>, 31 pages (with English Translation).

(Continued)

Primary Examiner — Dalzid E Singh
(74) Attorney, Agent, or Firm — Fish & Richardson P.C.

(57) ABSTRACT

Provided is a communication apparatus for making connection to a communication network, including: an optical network unit; and an external power supply input/output terminal, the communication apparatus being configured such that electrical power is fed to the optical network unit from an external terminal that is connected to the external power supply input/output terminal and functions as an auxiliary power supply.

7 Claims, 14 Drawing Sheets

(56) References Cited

OTHER PUBLICATIONS

Tadokoro et al., "Power saving technology for network devices and its applications-ONU / wireless LAN sleep technology," NTT Technology Journal, 2014, retrieved from URL <https://www.ntt.co.jp/journal/1401/files/jn201401027.pdf>, 26(1):27-32, 13 pages (with English Translation).

\* cited by examiner

COMMUNICATION APPARATUS

CROSS-REFERENCE TO RELATED APPLICATIONS

This application is a National Stage application under 35 U.S.C. § 371 of International Application No. PCT/JP2019/042886, having an International Filing Date of Oct. 31, 2019, the disclosure of which is considered part of the disclosure of this application, and is incorporated in its entirety into this application.

TECHNICAL FIELD

The present invention relates to an in-home communication apparatus connected to a communication network.

BACKGROUND ART

In order to connect a user terminal or the like located in a user's home such as a general household to a communication network (such as an IP communication network), it is general to install, in the home, an in-home communication apparatus including an optical network unit (ONU) and a home gateway (HGW).

For an operation of the in-home communication apparatus, it is necessary to feed thereto electrical power from a commercial power supply and the like. Accordingly, at the time of power outage, the in-home communication apparatus cannot receive electrical power, and thus does not operate.

CITATION LIST

Non-Patent Literature

Non-Patent Literature 1: NTT Access Network Service Systems Laboratories, "Power-saving Technologies for Network Equipment and Their Application—ONU/wireless-LAN Sleep Technologies," NTT technical Review 26(1), 27-32, 2014-01, January 2014, URL: https://www.ntt.co.jp/journal/1401/files/jn201401027.pdf Non Patent Literature 2: Nippon Telegraph and Telephone West Corporation, Specifications required for Small-ONU-Compatible Terminals, https://www.ntt-west.co.jp/business/service/onu/pdf/interface.pdf

SUMMARY OF THE INVENTION

Technical Problem

As described above, at the time of power outage, the operation of the in-home communication apparatus stops, and a user cannot connect to the Internet, make a telephone call, and perform other such actions.

The present invention has been made in view of the above-mentioned point, and has an object to provide a technology that makes connection to a communication network and enables utilization of a communication service even at the time of power outage.

Means for Solving the Problem

According to the disclosed technology, provided is a communication apparatus for making connection to a communication network, including:
an optical network unit; and
an external power supply input/output terminal,
the communication apparatus being configured such that electrical power is fed to the optical network unit from an external terminal that is connected to the external power supply input/output terminal and functions as an auxiliary power supply.

Effects of the Invention

According to the disclosed technology, provided is a technology that makes connection to a communication network and enables utilization of a communication service even at the time of power outage.

DESCRIPTION OF EMBODIMENTS

Hereafter, an embodiment mode of the present invention (the present embodiment mode) is described with reference to the drawings. The embodiment mode described below is a mere example, and embodiment modes to which the present invention is applied are not limited to the following embodiment mode.

A problem to be solved by a technology described in the embodiment mode is first described in the following, and the embodiment mode of the present invention is then described using embodiments.

(Configuration Example of In-Home Communication Apparatus)

Figure 1:
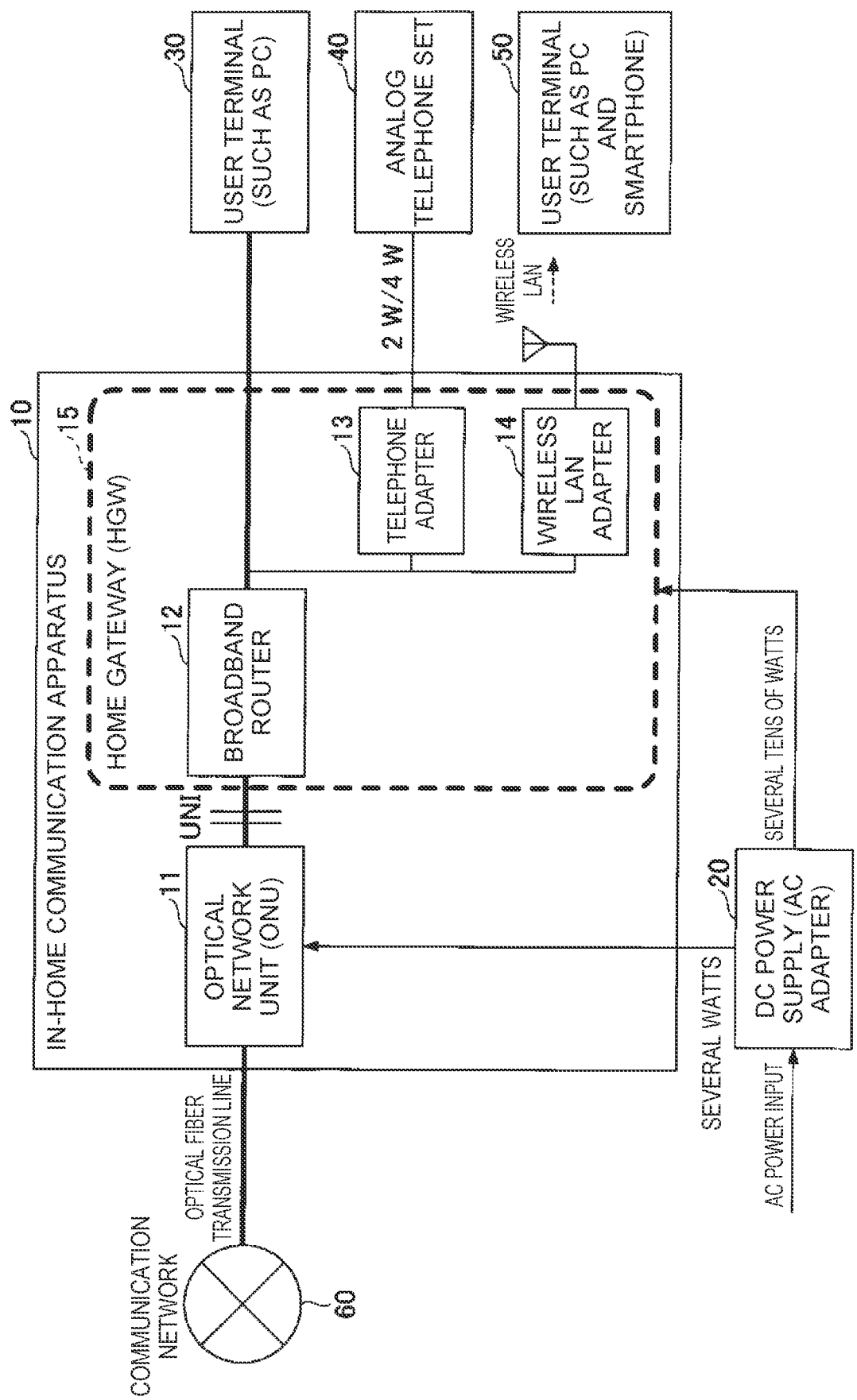
FIG. 1 is a diagram illustrating an example of a system configuration of an in-home communication apparatus and peripheral devices.

FIG. 1 illustrates a configuration example of an in-home communication apparatus 10, peripheral devices, and the like. The in-home communication apparatus 10 illustrated in FIG. 1 includes an optical network unit 11 and a home gateway 15. Note that, the optical network unit may be referred to as an ONU, and the home gateway may be referred to as an HGW. The HGW 15 includes a broadband router 12, and further includes a telephone adapter 13 and a wireless LAN adapter 14 depending on its device type.

The ONU 11 and the HGW 15 are connected to each other by a UNI (user-network interface). Moreover, both the ONU 11 and the HGW 15 receive electrical power from a DC power supply 20 (AC adapter), and operate with the electrical power. The ONU 11 has a function of converting an optical signal into an electrical signal and converting an electrical signal into an optical signal, and is connected to a communication network 60 by an optical fiber transmission line. The communication network 60 of the present embodiment mode includes an IP communication network, a telephone network, and the like.

In the example of FIG. 1, a user terminal 30 (such as a PC) and an analog telephone set 40 are connected to the HGW 15. Moreover, a user terminal 50 (such as a PC and a smartphone) performs wireless communication with the HGW 15.

(Situation in Case of Power Outage)

Figure 2:
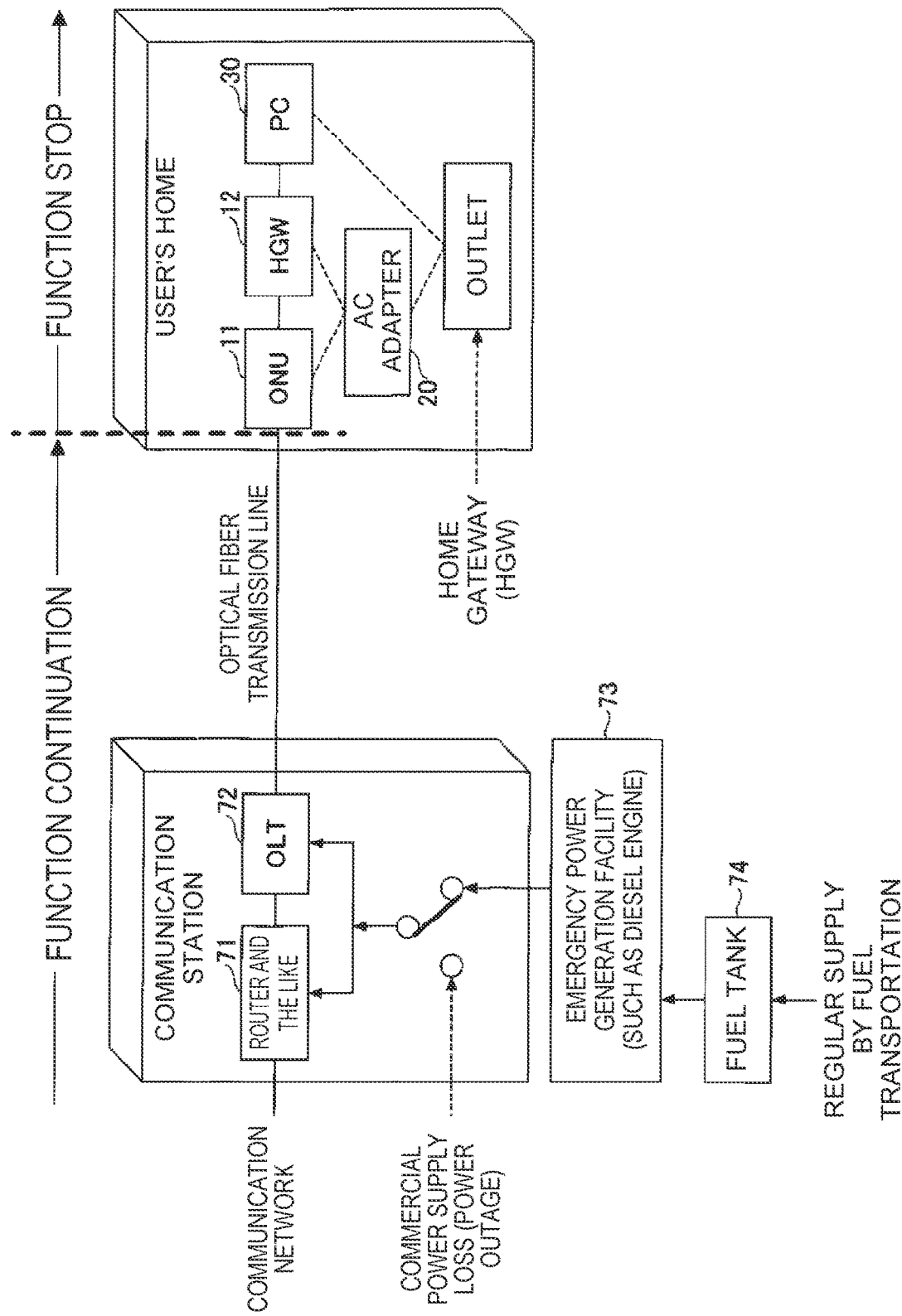
FIG. 2 is a diagram illustrating situations of a communication station and the in-home communication apparatus at the time of a commercial power supply loss.

A situation of power outage of a commercial power supply at the time of a disaster and the like is described. First, a situation of a communication station at the time of power outage is described. FIG. 2 is a diagram illustrating situations of the communication station and the in-home communication apparatus 10 at the time of a commercial power supply loss.

As illustrated in FIG. 2, the communication station (communication building) is equipped with an OLT (optical line terminal) 71, a router 71, and the like connected to the ONU 11. Generally, the communication station is equipped with an emergency power generation facility 73, a fuel tank 74, and the like, and hence electrical power can be obtained on the communication station side if a fuel is regularly supplied at the time of power outage. Therefore, a communication function can be maintained on the communication station side.

However, the in-home communication apparatus 10 on the user side does not normally have an external power supply for emergency, and thus stops operating due to the power outage, so that the user cannot connect to the communication network 60.

With regard to the external power supply necessary to operate the in-home communication apparatus 10 (the HGW and the ONU) at the time of power outage, the electrical power consumption of both the HGW and the ONU is approximately 10 to 20 W, and hence the cost is high if the functions thereof are maintained using a dry battery and the like. Moreover, an external power supply such as a household UPS is expensive and large in apparatus size, and hence it is difficult for the user to be equipped with the external power supply as a measure against the time of power outage of the in-home communication apparatus 10.

As described above, at the time of power outage, a large part of the optical fiber communication network and transmission lines can be maintained by the power generation facility and the like in the communication station, while the function of the in-home communication apparatus 10 on the user side is stopped. Accordingly, at the time of power outage, the user cannot connect the user terminal and the like to the communication network 60.

If the user terminal is a terminal for mobile communication such as a smartphone, the user terminal can perform wireless communication via a base station. However, most of base stations are small in facility size, and backup power supplies thereof are storage batteries in many cases. Therefore, at the time of power outage due to a disaster and the like, there is a high possibility of the occurrence of: a situation where the power supply is exhausted in several days and the base station is stopped; and a situation where congestion is caused by a concentration of accesses and connection becomes difficult. As a result, it is conceivable that it is difficult for the terminal for mobile communication such as the smartphone to perform wireless communication.

Outline of Embodiment Mode

In the present embodiment mode, described is a technology in which, even at the time of power outage, the in-home communication apparatus 10 connects the user terminal and the like to the communication network and enables utilization of a communication service. Hereinafter, an apparatus not including an HGW and including an ONU is also referred to as an in-home communication apparatus. Moreover, the in-home communication apparatus may be referred to as a "communication apparatus."

In the present embodiment mode, it is assumed that only minimum devices in the in-home communication apparatus are operated in order to secure minimum communication for the user.

Figure 3:
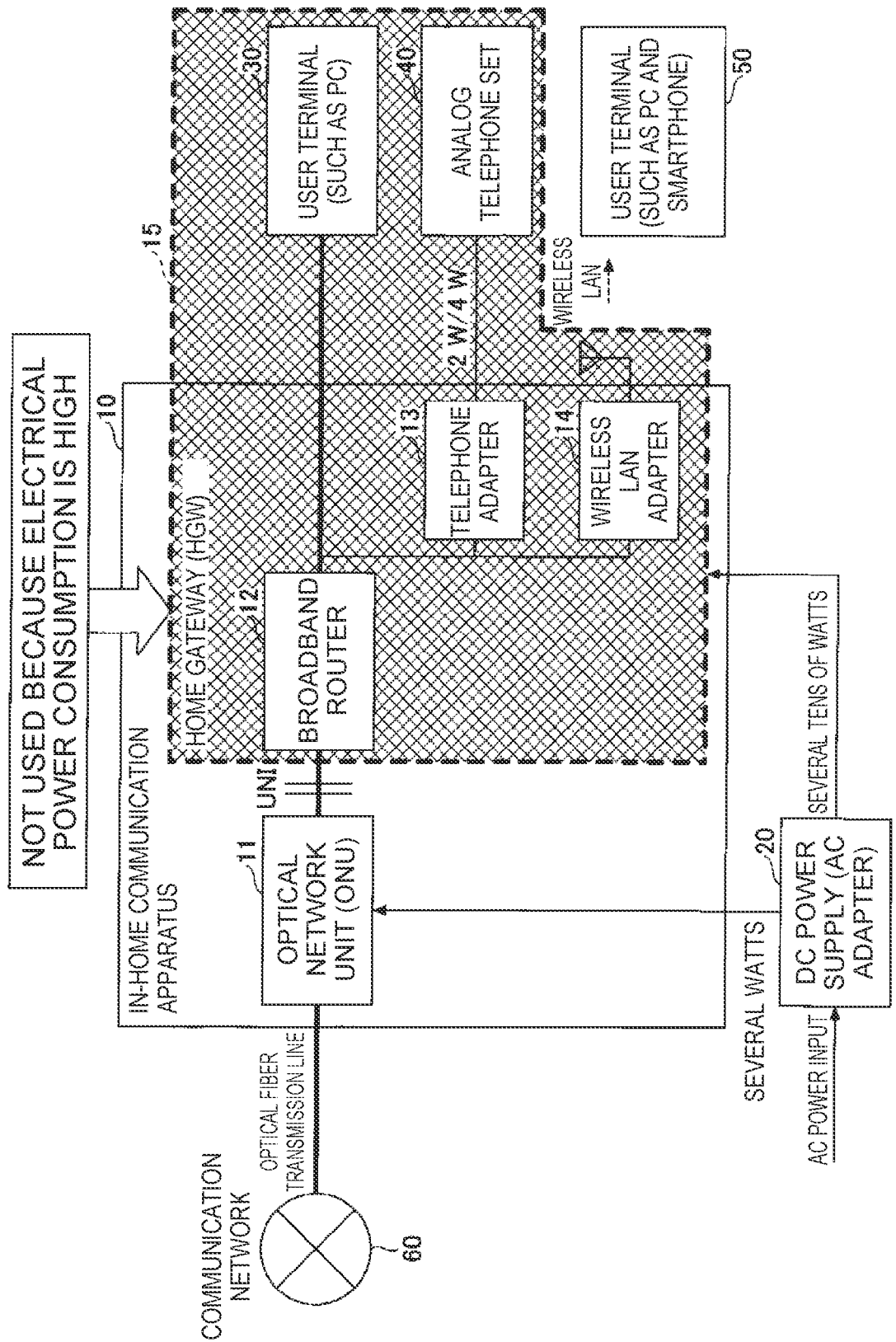
FIG. 3 is a diagram for describing an outline of an embodiment mode of the present invention.

More specifically, as illustrated in FIG. 3, the ONU 11 is a physical media converter that performs optical/electrical conversion, and is not stopped because another device cannot be used as a substitute therefor. On the other hand, the operation of the HGW 15 in charge of routing and a connection sequence is stopped because the function thereof can be executed by another device through software processing. The electrical power consumption of the HGW 15 is higher than the electrical power consumption of the ONU 11, and hence a high power-saving effect can be obtained by not operating the HGW 15.

Moreover, in addition to the broadband router that executes the routing and the connection sequence, the HGW 15 includes a telephone adapter, a switching hub function, and the like depending on a device, but it does not matter even if the HGW 15 is not operated, because the telephone adapter, the switching hub function, and the like are not necessarily required at the time of a disaster. Meanwhile, the routing and the connection sequence executed by the broadband router is a function necessary to connect to the Internet and the like, and hence this function is realized by introducing applications into the user terminal such as the smartphone.

Hereafter, the in-home communication apparatus of the present embodiment mode is described using Embodiments 1 to 3. Although the in-home communication apparatus of the present embodiment mode is assumed to be used at the time of power outage of the commercial power supply, the in-home communication apparatus is not limitedly used thereto, and may be used in a manner similar to that at the time of power outage when the power outage does not occur. Moreover, respective functions and respective processing contents described in Embodiment 1, Embodiment 2, and Embodiment 3 may be combined as appropriate.

Embodiment 1

Embodiment 1 is classified into Embodiments 1-1 to 1-4. Each embodiment is described.

Embodiment 1-1

Figure 4:
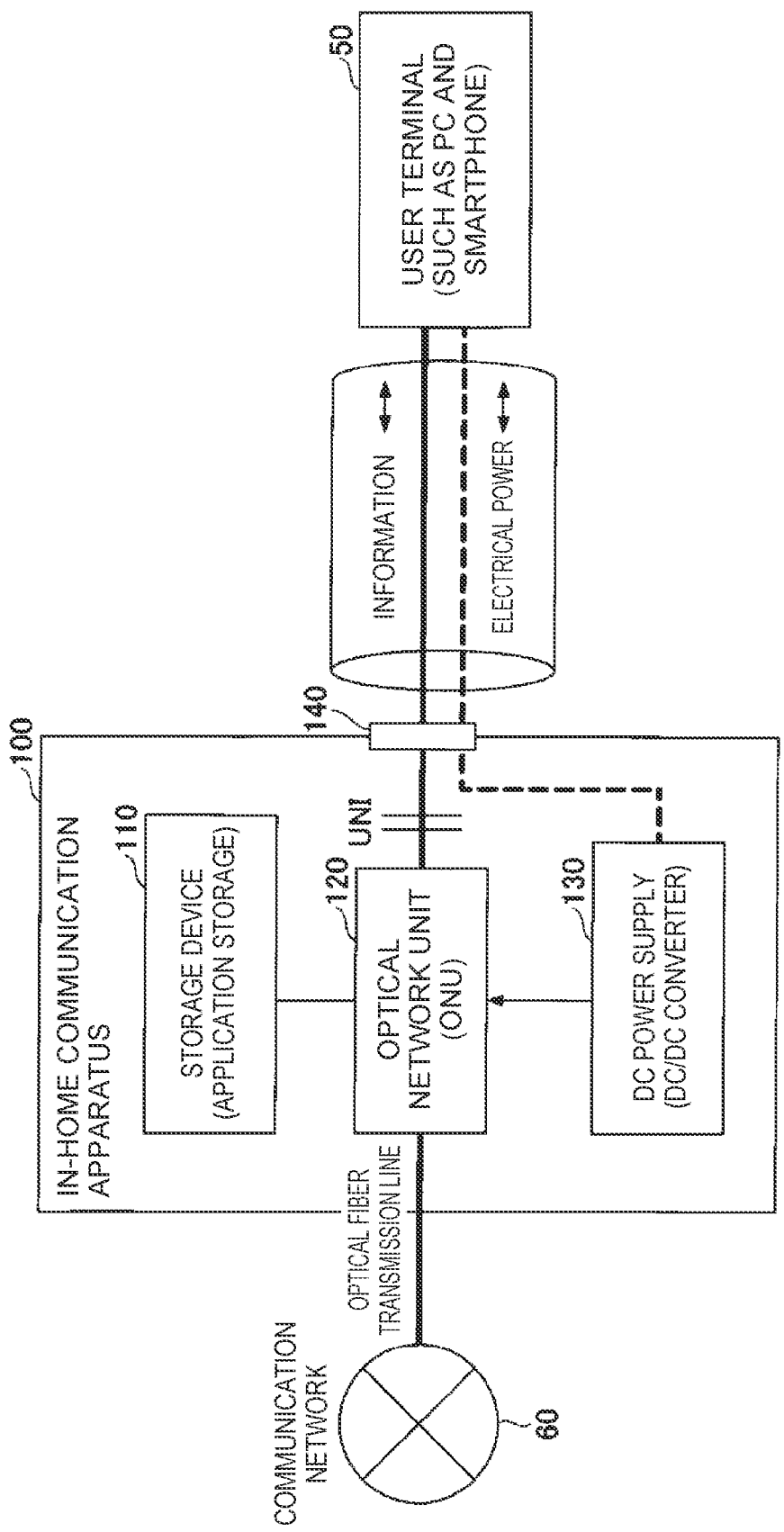
FIG. 4 is a diagram illustrating a configuration example of an in-home communication apparatus of Embodiment 1-1.

FIG. 4 illustrates a configuration example of an in-home communication apparatus 100 of Embodiment 1-1. In the configuration of FIG. 4, the ONU is separated from the HGW, and the in-home communication apparatus 100 does not include the HGW.

As illustrated in FIG. 4, the in-home communication apparatus 100 of Embodiment 1-1 includes a storage device 110, an ONU 120, a DC power supply 130, and an external power supply input/output terminal 140.

The ONU 120 is connected to the communication network 60 by an optical fiber transmission line. The storage device 110 is, for example, a flash memory that can store information therein without any power supply. The external power supply input/output terminal 140 is an Ethernet (registered trademark) terminal such as RJ45 or a general-purpose input/output terminal such as a USB terminal, and the user terminal 50 is connected via the external power supply input/output terminal 140. The user terminal 50 is, for example, a smartphone, a tablet, and a PC (such as a notebook PC).

Note that, in a normal state (in a state without power outage), the in-home communication apparatus 100 of Embodiment 1-1 is connected to the HGW, and electrical power is fed thereto from the commercial power supply by an AC adapter (the same applies to Embodiments 1-2 to 1-4 and Embodiment 2). In the case where power outage or the like occurs, the user disconnects the HGW, and connects the user terminal 50 instead. However, such a usage pattern is an example, and the in-home communication apparatus 100 (the apparatus not including the HGW) of Embodiment 1-1 may be provided alone (the same applies to Embodiments 1-2 to 1-4 and Embodiment 2).

The in-home communication apparatus 100 of Embodiment 1-1 is operated by the electrical power fed from the user terminal 50 connected to the external power supply input/output terminal 140. That is, the user terminal 50 functions as an auxiliary power supply. Moreover, an application having an HGW function is installed in the user terminal 50, and the user terminal 50 can connect to the communication network 60 (such as the IP communication network) by executing this application.

More specifically, the above-mentioned application provides, for example, a PPPoE or IPoE client service, and causes the user terminal 50 to execute a connection sequence for connection to an IPv4/v6 network.

In order to realize the operation by the above-mentioned application, the in-home communication apparatus 100 executes the following operation.

During a normal time, the in-home communication apparatus 100 downloads information on connection to the IP communication network (such as an ID for ISP connection) and an application that executes the sequence for connection (an application for realizing the HGW function), from a server on the communication network 60. Note that, the process of downloading the connection information and the application may be executed by the ONU 120 in the in-home communication apparatus 100, may be executed by the storage device 110 in the in-home communication apparatus 100, and may be executed by any other means in the in-home communication apparatus 100. Moreover, this downloading may be controlled from the server on the communication network 60.

The downloaded connection information and the downloaded application are stored in the storage device 110. The information stored in the storage device 110 is read by the user terminal 50 connected to the external power supply input/output terminal 140 (a point of connection to the user terminal 50).

Note that, it is assumed that the above-mentioned process of downloading can be executed only in a closed network from a security perspective, but the execution of the above-mentioned process of downloading is not limited thereto.

Moreover, in the case of operating at the time of power outage, the in-home communication apparatus 100 can perform the power-saving operation based on the cyclic sleep disclosed in Non Patent Literature 1. Similarly in Embodiments 2 and 3, the in-home communication apparatus 100 can perform the power-saving operation. Note that, Non Patent Literature 1 is "NTT Access Network Service Systems Laboratories, "Power-saving Technologies for Network Equipment and Their Application—ONU/wireless-LAN Sleep Technologies," NTT technical Review 26(1), 27-32, 2014-01, January 2014."

Embodiment 1-2

Figure 5:
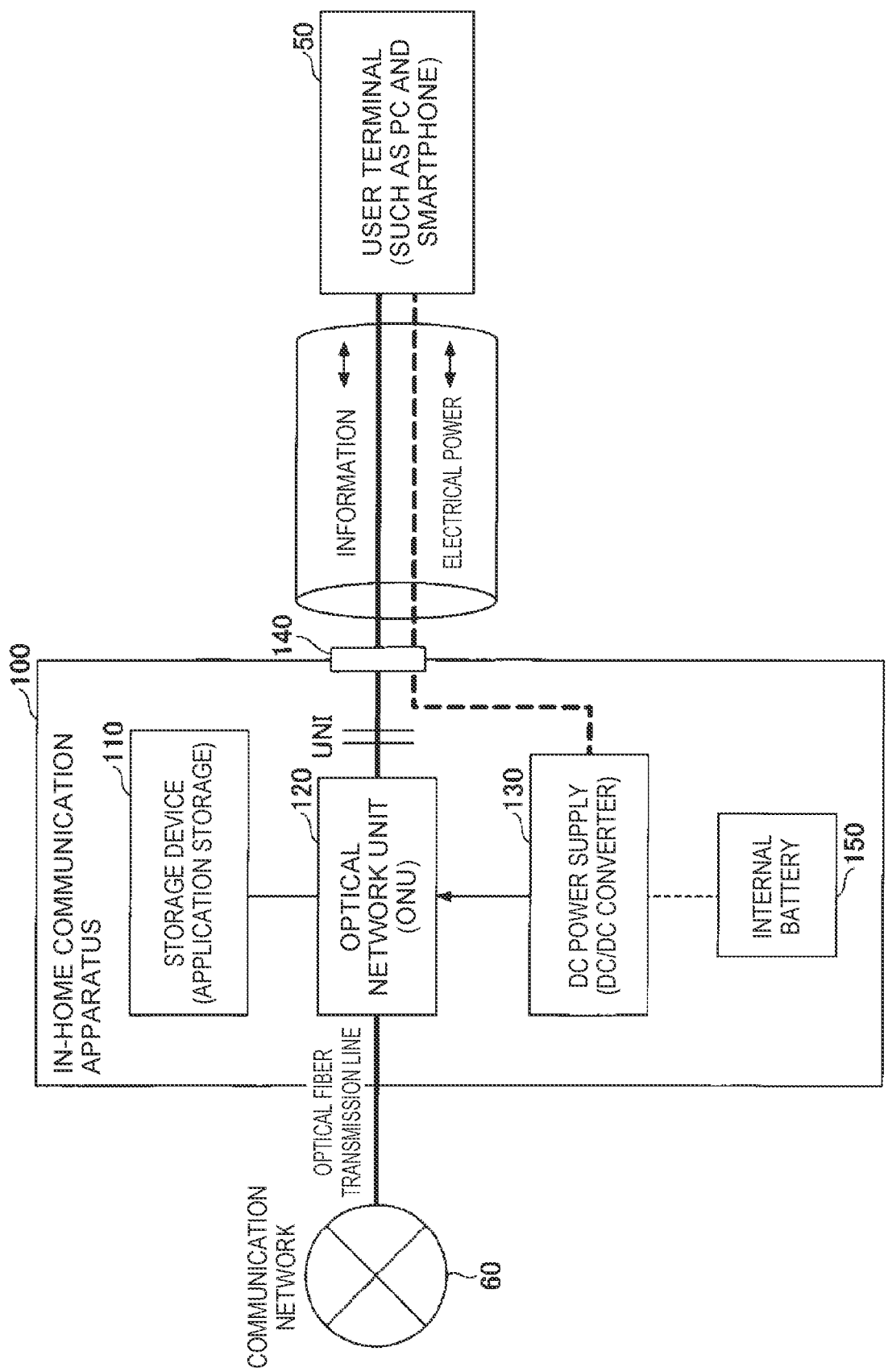
FIG. 5 is a diagram illustrating a configuration example of an in-home communication apparatus of Embodiment 1-2.

FIG. 5 is a diagram illustrating a configuration example of an in-home communication apparatus 100 of Embodiment 1-2. The in-home communication apparatus 100 of Embodiment 1-2 has a configuration in which an internal battery 150 (which may be referred to as a storage battery) is added to the in-home communication apparatus 100 of Embodiment 1-1.

For example, in the case where the electrical power fed from the user terminal 50 is small, the internal battery 150 accumulates therein the electrical power from the user terminal 50. The accumulated electrical power is used by an operation (for example, a cyclic operation) of the in-home communication apparatus 100.

Moreover, the internal battery 150 may be charged during a normal time without power outage. Then, in addition to feeding electrical power from the internal battery 150 for the operation of the in-home communication apparatus 100 at the time of power outage, electrical power may be fed to the user terminal 50 at the time of power outage.

Embodiment 1-3

Figure 6:
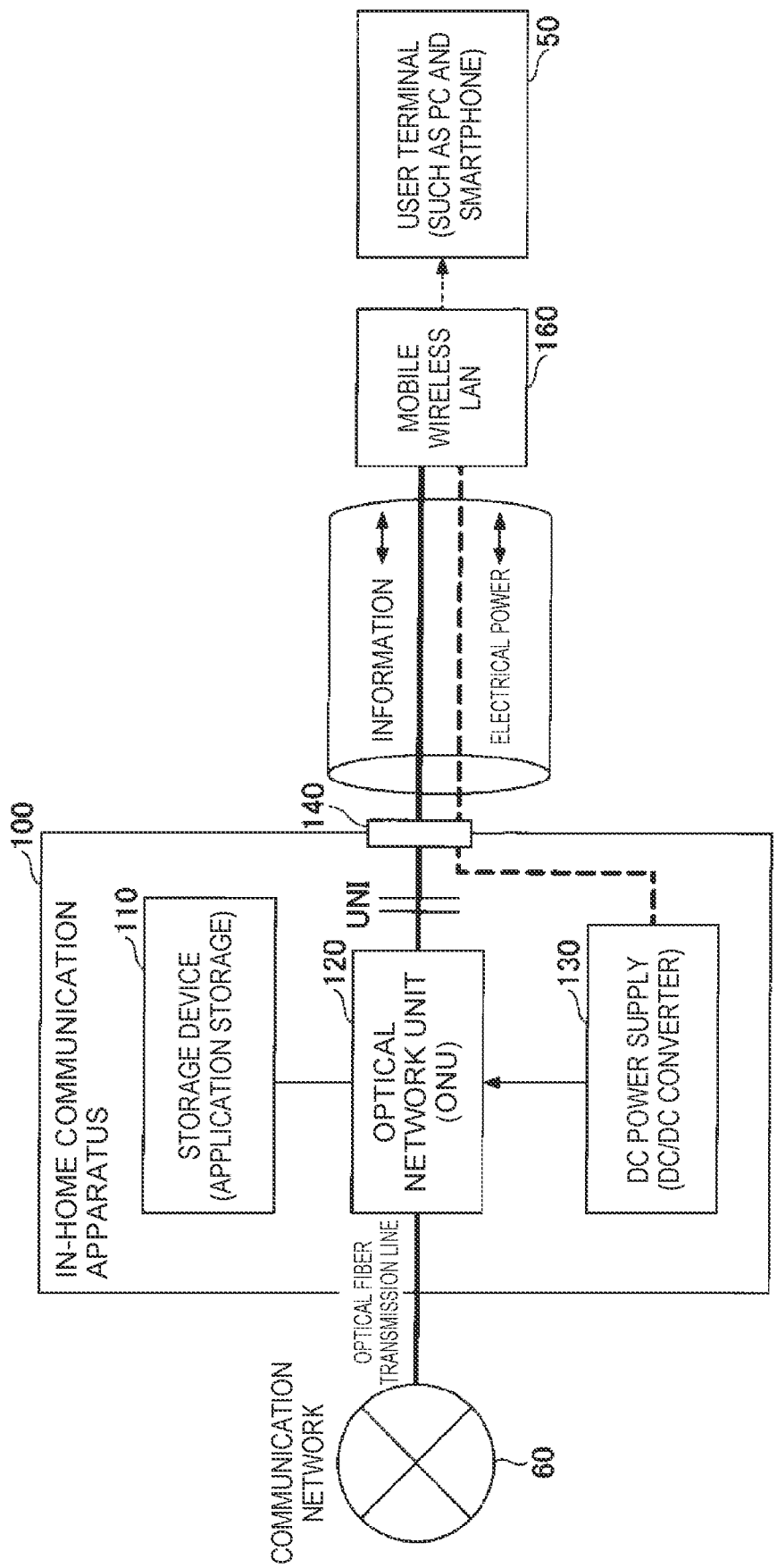
FIG. 6 is a diagram illustrating a configuration example of an in-home communication apparatus of Embodiment 1-3.

FIG. 6 is a diagram illustrating a configuration example of an in-home communication apparatus 100 of Embodiment 1-3. The in-home communication apparatus 100 of Embodiment 1-3 has the same configuration as that of the in-home communication apparatus 100 of Embodiment 1-1.

In Embodiment 1-3, a mobile wireless LAN router 160 is connected to the external power supply input/output terminal 140. The user terminal 50 wirelessly connected to the mobile wireless LAN router 160 reads the application and the connection information described in Embodiment 1-1 from the storage device 110, and makes connection to the IP communication network 60. In Embodiment 1-3, a plurality of user terminals 50 can be connected.

Embodiment 1-4

Figure 7:
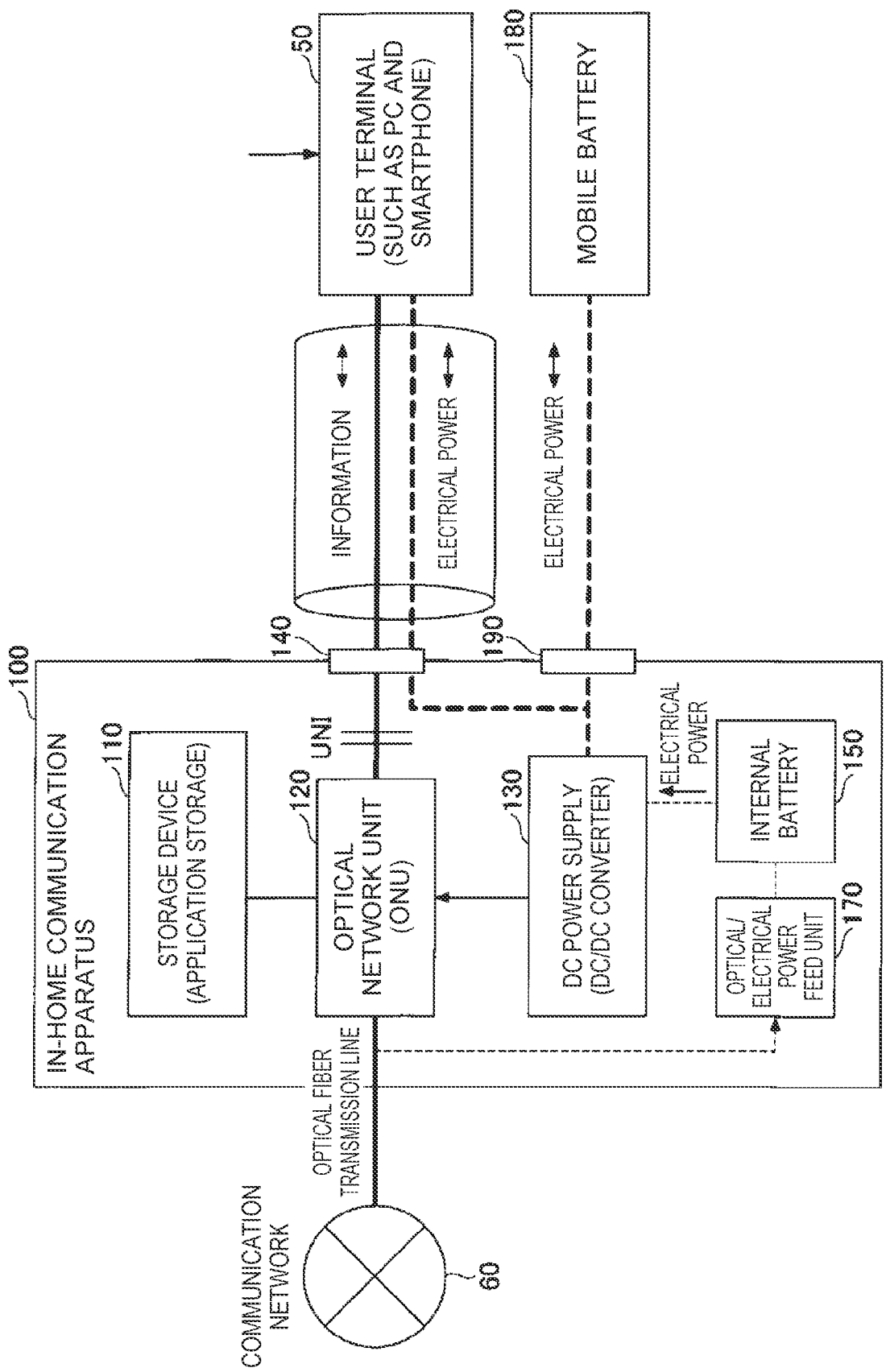
FIG. 7 is a diagram illustrating a configuration example of an in-home communication apparatus of Embodiment 1-4.

FIG. 7 is a diagram illustrating a configuration example of an in-home communication apparatus 100 of Embodiment 1-4. The in-home communication apparatus 100 of Embodiment 1-4 has a configuration in which an optical/electrical power feed unit 170 is added to the in-home communication apparatus 100 (FIG. 5) of Embodiment 1-2. Moreover, an external power supply input/output terminal 190 is added, and a mobile battery 180 is connected to the external power supply input/output terminal 190.

At the time of power outage and the like, the in-home communication apparatus 100 can operate using electrical power fed from the mobile battery 180.

Moreover, the optical/electrical power feed unit 170 converts light received through an optical fiber into electrical power, and accumulates the electrical power in the internal battery 150 (which may be a capacitor). At the time of power outage and the like, the in-home communication apparatus 100 is operated using the electrical power accumulated in the internal battery 150.

Operation Example of Embodiment 1

An operation example of Embodiment 1 is described with reference to a sequence diagram of FIG. 8. Although description is given as an example based on the configuration (FIG. 4) described in Embodiment 1-1, a similar operation applies to Embodiments 1-2 to 1-4 and Embodiments 2 and 3. Moreover, description is given here assuming that the communication network 60 is the IP communication network 60.

In S101 during a normal time, the in-home communication apparatus 100 downloads the connection information (for example, an ID, a password, ISP information, an IP address, and the like) and the application from the server on the IP communication network 60. In S102, the in-home communication apparatus 100 stores the downloaded items in the storage device 110. Here, assuming that the HGW is connected during the normal time, the HGW may download the connection information and the application during the normal time, and the in-home communication apparatus 100 may acquire the connection information and the application from the HGW, and may store the acquired items in the storage device 110.

Alternatively, the user may download the connection information and the application in the user terminal 50 in advance. In this case, the in-home communication apparatus 100 may not include the storage device 110.

If power outage occurs, the operations of the ONU, the HGW, and the like stop. The user connects the user terminal 50 to the in-home communication apparatus 100 using a cable.

In S103, the user terminal 50 browses the storage device 110 in the in-home communication apparatus 100 (which is similar to a storage function provided by a USB memory or an SD card). In S104, the user terminal 50 acquires the application (executable file) stored in the storage device 110, and installs the application therein. Note that, in the case where the application is installed in advance in the user terminal 50, Steps S103 and S104 can be omitted.

In S105, the application is activated in the user terminal 50. In S106 and S107, the user terminal 50 acquires the connection information from the storage device 110 with the aid of a function of the activated application. Note that, the user may input the connection information (such as a password) prepared in advance into the user terminal 50. This can deal with the case where the connection information cannot be acquired from the storage device 110.

Through the above-mentioned processing, a function of connection to the IP communication network 60 equivalent to the HGW is configured on the user terminal 50.

In S108, a sequence of connection to the ISP (IP communication network 60) is started by the user terminal 50 on which the application is executed. The connection sequence itself is a general sequence, in which connection using PPPoE/IPoE or the like, IP address allocation, and the like are performed. In S109, the connection to the ISP is completed. In S110, communication is started.

During the communication after the connection in S110, the ONU 120 performs the cyclic communication disclosed in Non Patent Literature 1, and a reduction in standby electrical power consumption is sought.

When the communication is ended in S111, the application is ended on the user terminal 50 in S112, the held information on the connection to the ISP is deleted in S113, and the HGW configuration information is deleted from the user terminal 50 in S114. After that, the user disconnects the user terminal 50 from the in-home communication apparatus 100.

<With Regard to Power-Saving Operation>

The power-saving operation of the in-home communication apparatus 100 of Embodiment 1 is described. Although description is given here as an example based on the in-home communication apparatus 100 of Embodiment (Embodiments 1-1 to 1-4), a similar operation applies to Embodiments 2 and 3 to be described later.

In the case where the in-home communication apparatus 100 operates with electrical power from an auxiliary power supply such as the user terminal 50 and the internal battery 150 at the time of power outage, the ONU 120 in the in-home communication apparatus 100 can perform the power-saving operation disclosed in Non Patent Literature 1. In the case where the power outage is detected or the case where it is detected that the user terminal 50 or the mobile battery 180 is connected to the external power supply input/output terminal 140 or 190, the ONU 120 can change from a normal operation to the power-saving operation.

The above-mentioned power-saving operation is a cyclic sleep operation in which a sleep state and an active state are alternately repeated, as disclosed in Non Patent Literature 1.

Moreover, the ONU 120 monitors remaining-amount-of-charge information (SoC) on an auxiliary power supply such as a battery of the user terminal 50, the mobile battery 180, or the internal battery 150 connected to the optical/electrical power feed unit 170. The ONU 120 controls the sleep cycle on the basis of a value of this SoC, whereby the ONU 120 can be driven for a longer period of time. For example, in the cyclic sleep period in which the sleep state and the active state are alternately repeated, the smaller the remaining amount of charge is, the less frequently the ONU 120 is activated, and the longer the sleep period of the ONU 120 is. Note that, the ONU 120 may include control means for performing the above-mentioned control, and the control means may be provided in the in-home communication apparatus 100 separately from the ONU 120.

Figure 9:
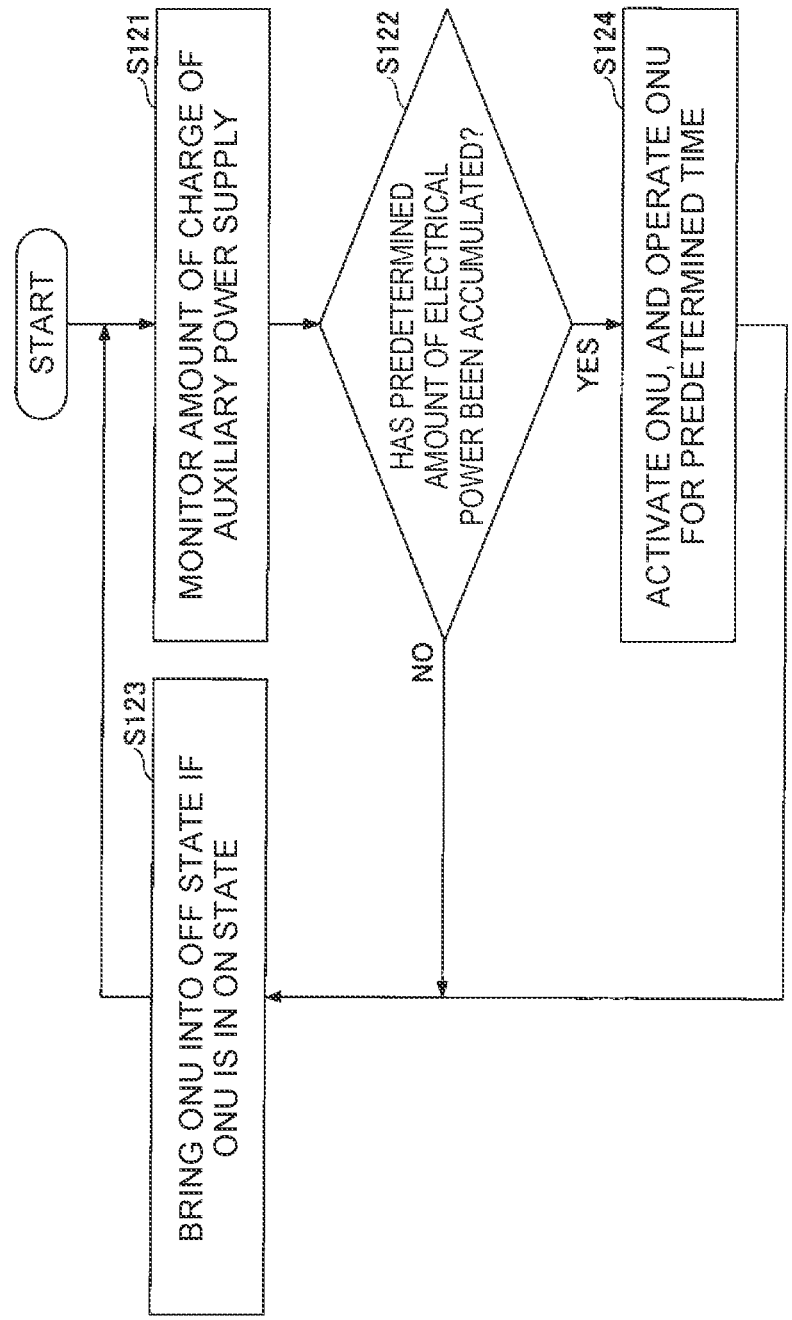
FIG. 9 is a flowchart for describing an example of a power-saving operation.

Moreover, in order to operate the ONU 120 even with a tiny amount of electrical power obtained by optical/electrical power feeding or the like, the control means may execute a procedure in a flowchart illustrated in FIG. 9. Note that, control means for executing control of FIG. 9 (and FIG. 10 to be described later) may be provided in the in-home communication apparatus 100 separately from the ONU 120, and the ONU 120 itself may include the control means. In the following description, it is assumed that the ONU 120 itself includes the control means. It is assumed that the minimum electrical power necessary to operate the control means is fed even when the ONU 120 is in an OFF state.

In S121 of FIG. 9, the control means of the ONU 120 monitors the amount of charge (SoC) of the auxiliary power supply (for example, the internal battery 150 in Embodiment 1-4) using optical/electrical power feeding or the like. In S122, the control means of the ONU 120 determines whether a predetermined amount of electrical power (for example, the electrical power that enables the ONU 120 to be driven for a predetermined time) has been accumulated in the auxiliary power supply.

In the case where the determination result in S122 is Yes (in the case where the predetermined amount of electrical power has been accumulated), the procedure goes on to S124, and the control means activates the ONU 120 (brings the ONU 120 into an ON state), and operates the ONU 120 for the predetermined time. After that, the procedure goes on to S123. In S123, the control means brings the ONU 120 into the OFF state if the ONU 120 is in the ON state.

In the case where the determination result in S122 is No (in the case where the predetermined amount of electrical power has not been accumulated), the control means does not activate the ONU 120, and continues to determine whether the predetermined amount of electrical power has been accumulated in the auxiliary power supply.

That is, in the process of FIG. 9, the control means repeats an operation of: not activating the ONU 120 (OFF state) until the electrical power that enables the ONU 120 to be driven for the predetermined time has been accumulated; and activating the ONU 120 (ON state) at the moment of detecting that the electrical power that enables the ONU 120 to be driven for the predetermined time has been accumulated, and operating the ONU 120 for the predetermined time.

Figure 10:
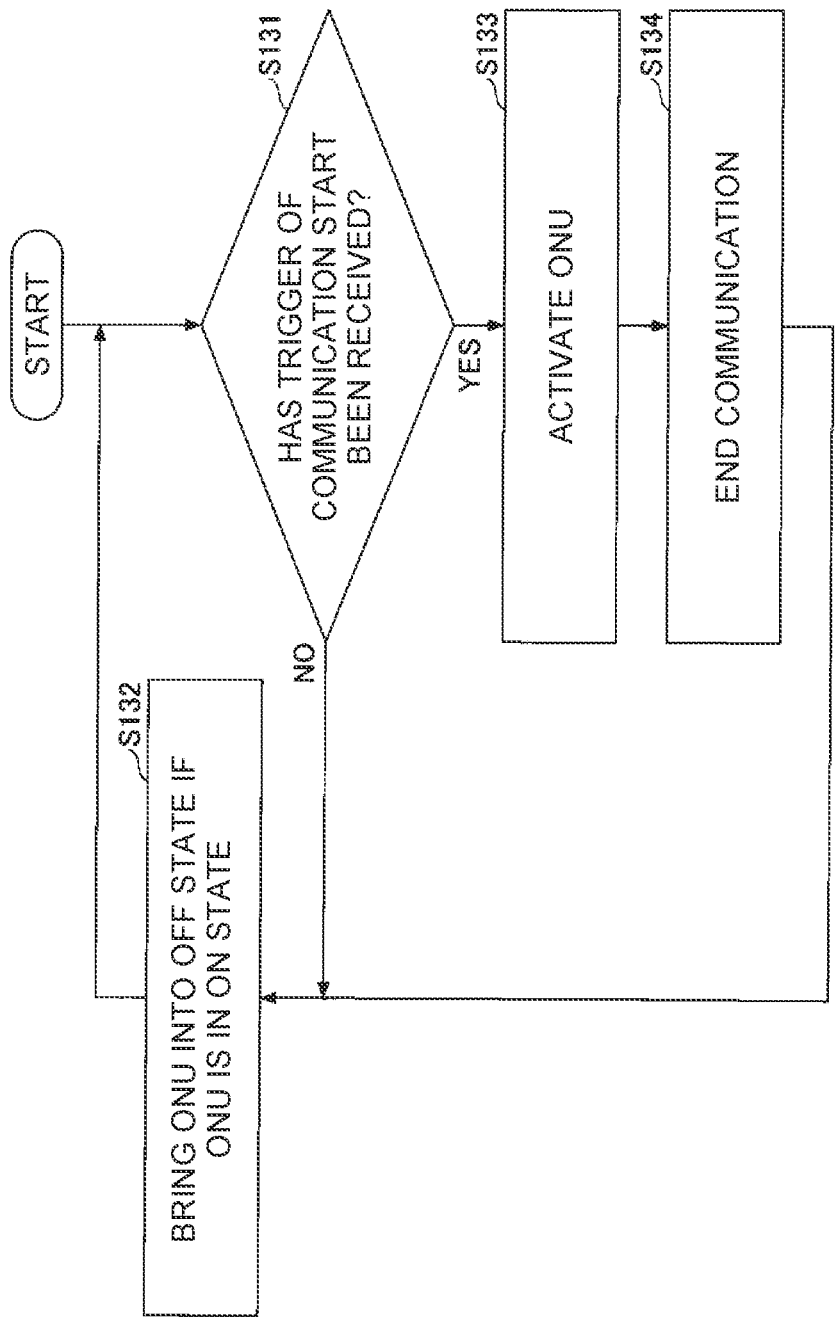
FIG. 10 is a flowchart for describing an example of the power-saving operation.

In order to operate the ONU 120 even with a tiny amount of electrical power obtained by optical/electrical power feeding or the like, the control means may execute a procedure in a flowchart illustrated in FIG. 10.

In S131 of FIG. 10, the control means of the ONU 120 determines whether or not a trigger of a communication start (ONU activation) has been received from the user terminal 50.

In the case where the determination result in S131 is Yes (in the case where the communication start trigger has been received), the control means activates the ONU 120 in S133. When communication concerning the communication start trigger is ended in S134, the control means brings the ONU 120 into the OFF state in S132.

In the case where the determination result in S131 is No (in the case where the communication start trigger has not been received), the control means continues to monitor the trigger with the ONU 120 being in the OFF state.

That is, in the process of FIG. 10, the control means performs an operation of: keeping the ONU 120 in the OFF state until the trigger of the communication start (ONU activation) has been received from the user terminal 50; and receiving the trigger of the communication start from the user terminal 50 and activating the ONU 120 (ON state) at the moment of communicating a sound or a message. After the activation, the control means brings the ONU 120 into the OFF state as soon as the communication is ended, and keeps the ONU 120 in a standby state (sleep state) until the next trigger is received.

Note that, the control means of the ONU 120 may acquire the remaining-amount-of-charge information (SoC) from the battery of the user terminal 50 or the mobile battery 180 via the external power supply input/output terminal 140 or 190 and the like, and the control means of the ONU 120 may report a poor state of charge to the communication station and the like before the remaining amount of charge reaches the amount with which the ONU 120 cannot operate. Note that, this report may be given by report means other than the ONU 120 in the in-home communication apparatus 100.

Embodiment 2

Next, an in-home communication apparatus 200 of Embodiment 2 is described. The in-home communication apparatus 200 of Embodiment 2 is an example of the small-ONU-compatible terminals using the small ONU disclosed in Non Patent Literature 2. As disclosed in Non Patent Literature 2, the small ONU is an optical line terminal to which an "SFP+" interface is adopted. "SFP+" is the abbreviation of "Small Form factor Pluggable+," and is an industry standard specification relating to an optical transceiver for communication.

Hereafter, Embodiment 2-1 and Embodiment 2-2 are described.

Embodiment 2-1

Figure 11:
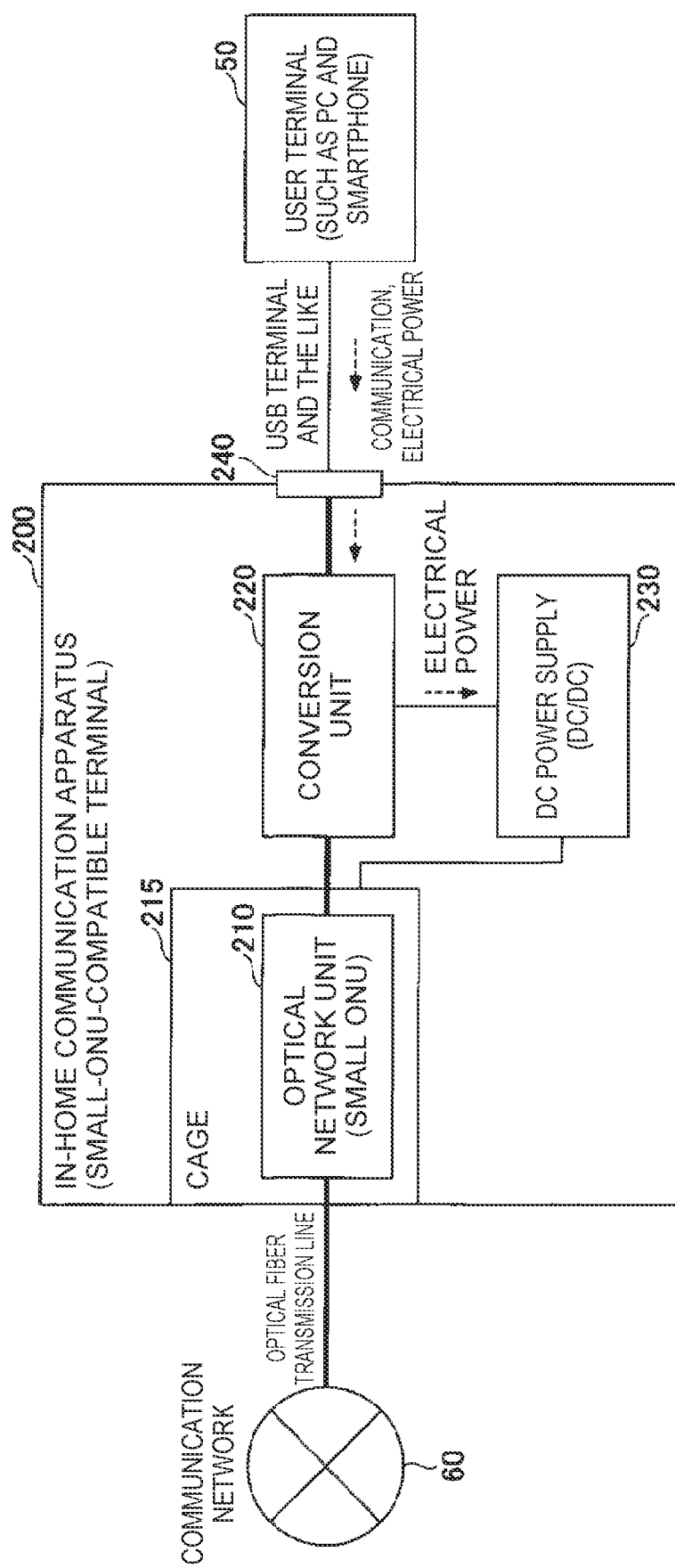
FIG. 11 is a diagram illustrating a configuration example of an in-home communication apparatus of Embodiment 2-1.

FIG. 11 is a configuration diagram of an in-home communication apparatus 200 of Embodiment 2-1, and illustrates a usage pattern at the time of power outage. Note that, during a normal time, electrical power is fed from the commercial power supply by the AC adapter.

As illustrated in FIG. 11, the in-home communication apparatus 200 of Embodiment 2-1 includes a cage 215, a small ONU 210 in the cage 215, a conversion unit 220, a DC power supply 230, and an external power supply input/output terminal 240. The cage 215 corresponds to "a portion to which the small ONU 210 is connected" in the small-ONU-compatible terminal (in-home communication apparatus 200).

The small ONU 210 is connected to the communication network 60 by an optical fiber transmission line. Here, the external power supply input/output terminal 240 is a USB terminal as an example. The user terminal 50 is connected via the external power supply input/output terminal 240. As described above, the user terminal 50 is, for example, a smartphone, a tablet, and a PC (such as a notebook PC). The conversion unit 220 performs, for example, conversion between the USB and Ethernet (registered trademark). At the time of power outage and the like, the in-home communication apparatus 200 operates by electrical power feeding from the user terminal 50.

Figure 8:
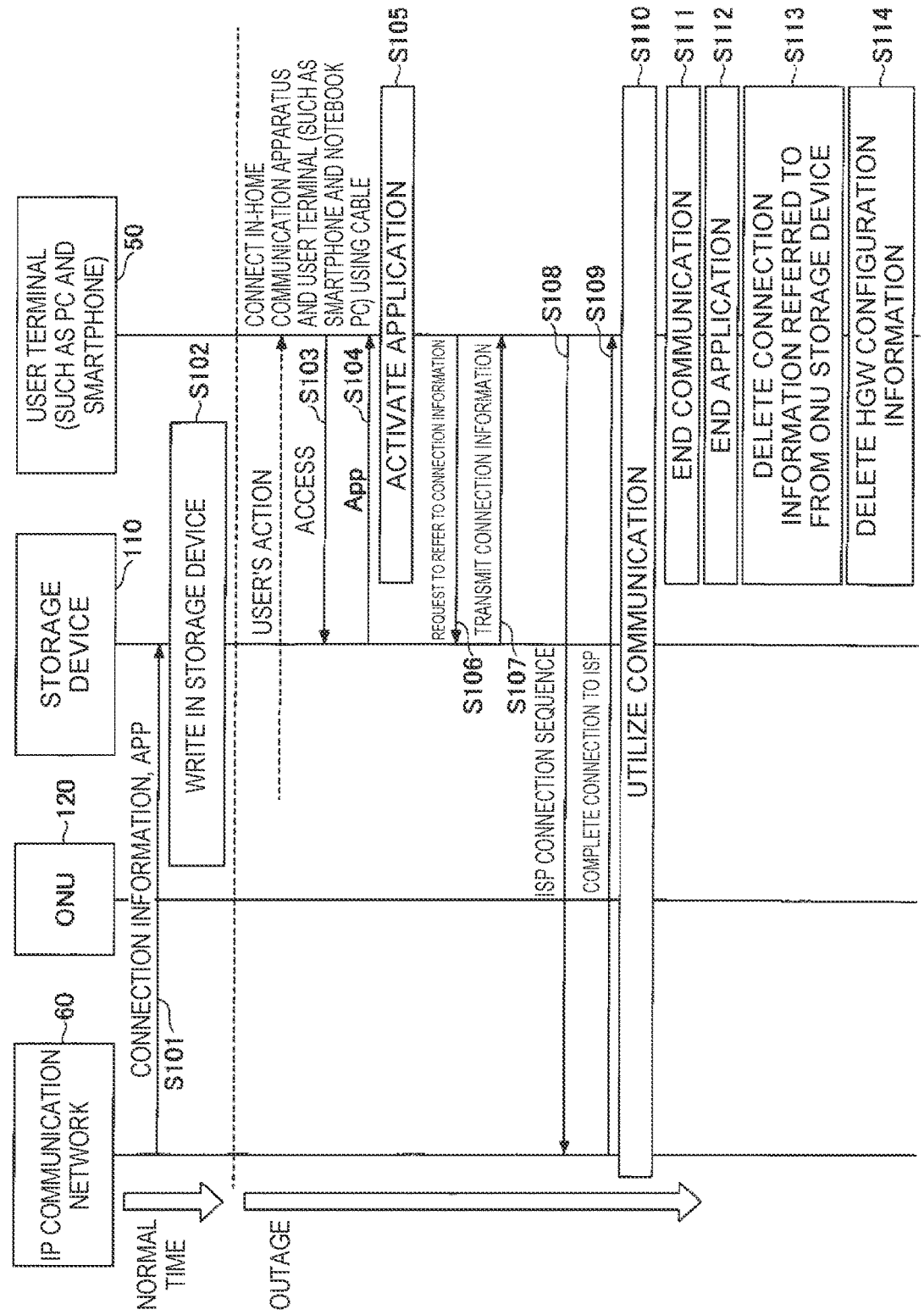
FIG. 8 is a diagram illustrating an example of a sequence in Embodiment 1.

An operation in Embodiment 2-1 is similar to the operation that is described in Embodiment 1 with reference to in FIG. 8. However, in Embodiment 2-1, the application and the connection information are acquired in advance by the user terminal 50.

Embodiment 2-2

Figure 12:
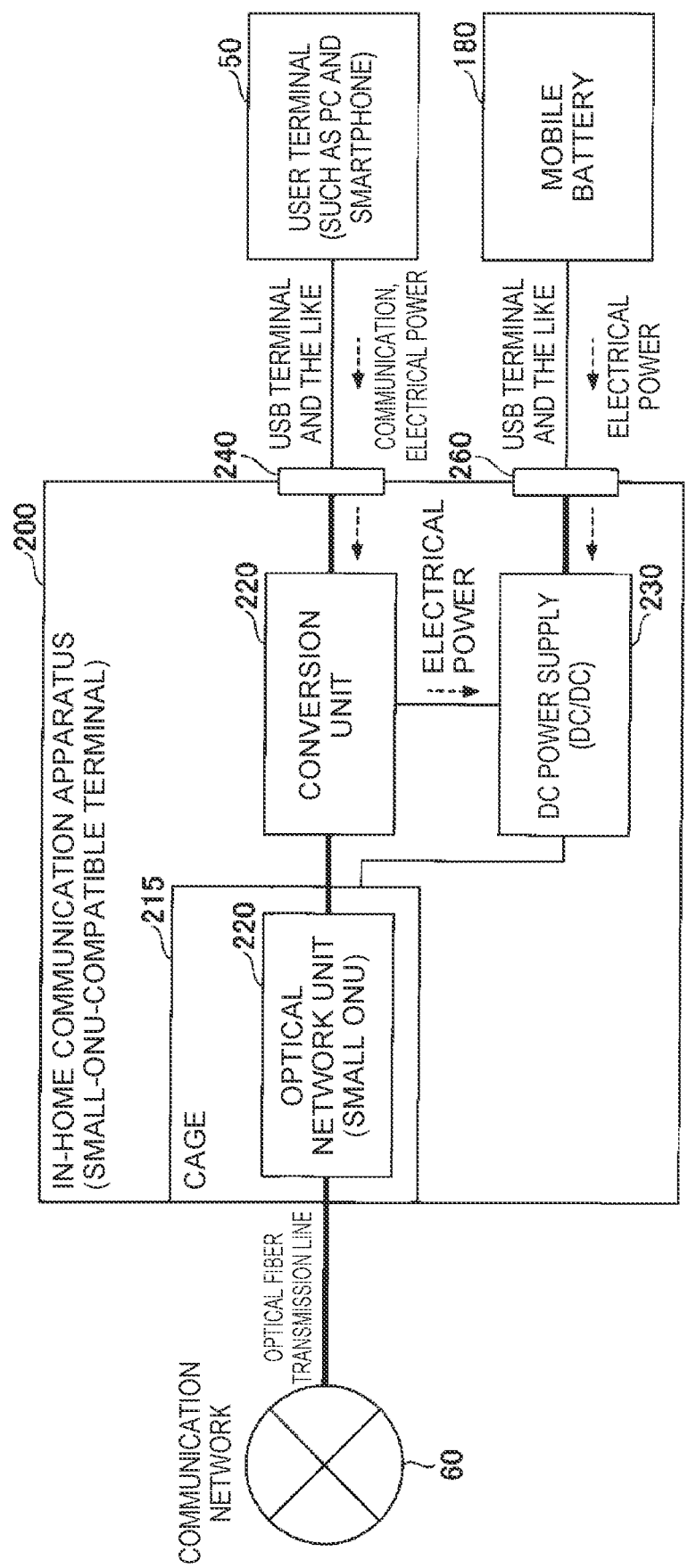
FIG. 12 is a diagram illustrating a configuration example of an in-home communication apparatus of Embodiment 2-2.

FIG. 12 illustrates a configuration in Embodiment 2-2. An in-home communication apparatus 200 of Embodiment 2-2 has a configuration in which an external power supply input/output terminal 260 is added to Embodiment 2-1. According to this configuration, a mobile battery 180 can be connected to the in-home communication apparatus 200 of Embodiment 2-2 in addition to the user terminal 50, and electrical power can be fed from the mobile battery 180 to the in-home communication apparatus 200 similarly to Embodiment 1-4.

Embodiment 3

Figure 13:
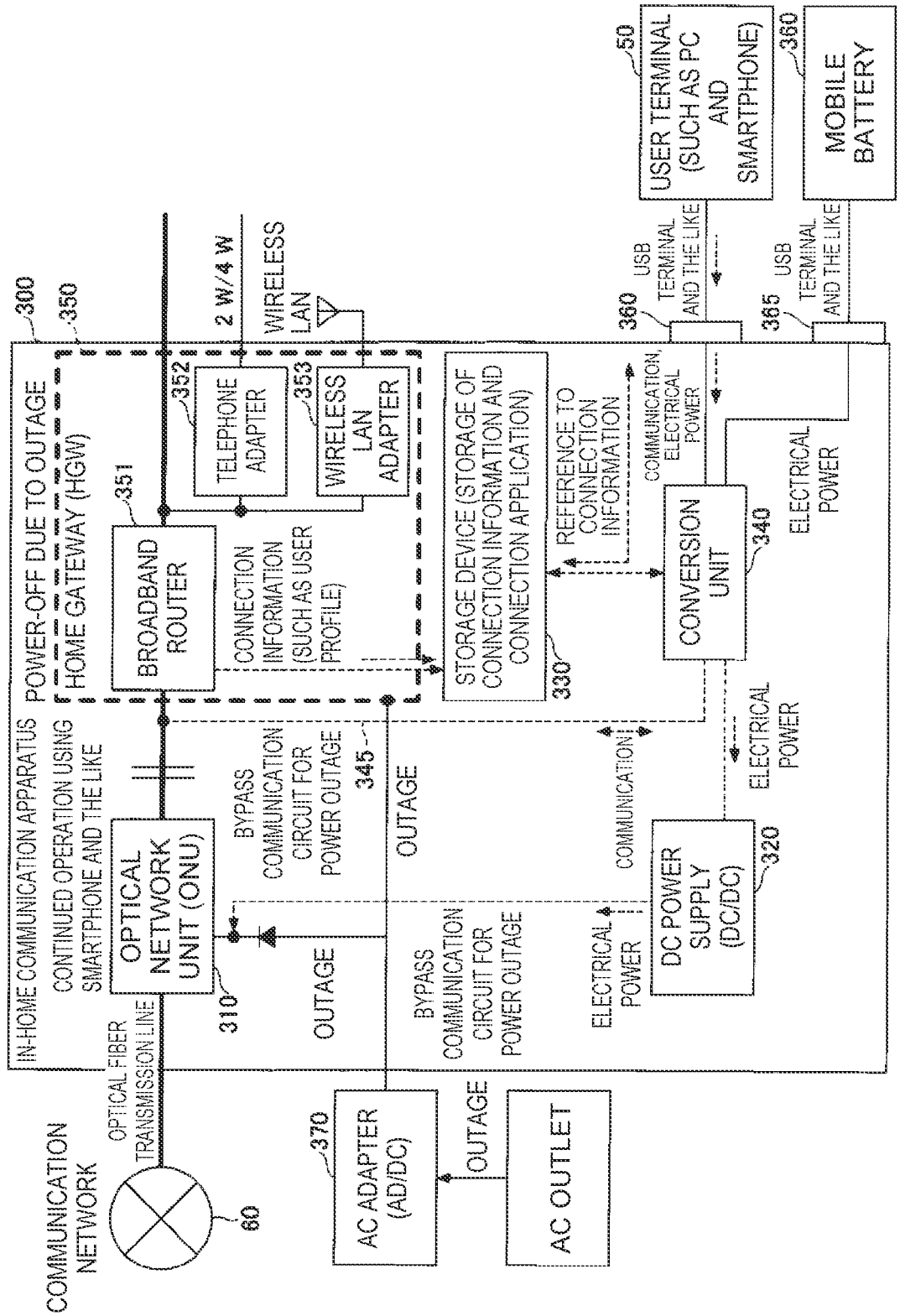
FIG. 13 is a diagram illustrating a configuration example of an in-home communication apparatus of Embodiment 3.

Next, Embodiment 3 is described. FIG. 13 illustrates a configuration example of an in-home communication apparatus 300 of Embodiment 3. The in-home communication apparatus 300 of Embodiment 3 basically corresponds to a configuration in which an HGW 350 is added to the in-home communication apparatus 100 of Embodiment 1 (the configuration without the HGW). Moreover, the in-home communication apparatus 300 of Embodiment 3 corresponds to a configuration in which a function of enabling the use of the user terminal 50 and the mobile battery 180 at the time of power outage is added to the in-home communication apparatus 10 illustrated in FIG. 1.

As illustrated in FIG. 13, the in-home communication apparatus 300 of Embodiment 3 includes an ONU 310, a DC power supply 320, a storage device 330, a conversion unit 340, external power supply input/output terminals 360 and 365 (such as a USB terminal), and the HGW 350. The HGW 350 includes a broadband router 351, a telephone adapter 352, and a wireless LAN adapter 353. Note that, the configuration of FIG. 13 is an example, and the in-home communication apparatus 300 may further include the optical/electrical power feed unit, the internal battery, and the like described in Embodiment 1.

The ONU 310 corresponds to the ONU 120 described in Embodiment 1. The storage device 330 corresponds to the storage device 110 described in Embodiment 1.

An operation in Embodiment 3 is basically the same as the operation that is described in Embodiment 1 with reference to in FIG. 8. However, in Embodiment 3, during a normal time, the HGW 350 downloads the connection information and the application, and the connection information and the application are stored in the storage device 330 from the broadband router 351 of the HGW 350. Note that, also in Embodiment 3, the connection information and the application may be acquired from the server on the IP communication network similarly to Embodiment 1.

During a normal time that is not the time of power outage, electrical power is fed by an AC adapter 370 from the commercial power supply to the in-home communication apparatus 300.

At the time of power outage, the electrical power feeding to the ONU 310 and the HGW 350 is stopped, and the operations of the ONU 310 and the HGW 350 stop.

The user connects the user terminal 50 to the external power supply input/output terminal 360 that is a terminal for connection to a bypass communication circuit 345. As a result, the user terminal 50 and the ONU 310 are connected to each other via the bypass communication circuit 345, and hence the operation at the time of power outage described in Embodiment 1 can be executed thereafter. That is, the user terminal 50 acquires the application from the storage device 330, and installs the application therein, to thereby execute the HGW function and connect to the IP communication network 60.

(Hardware Configuration Example of User Terminal 50)

Figure 14:
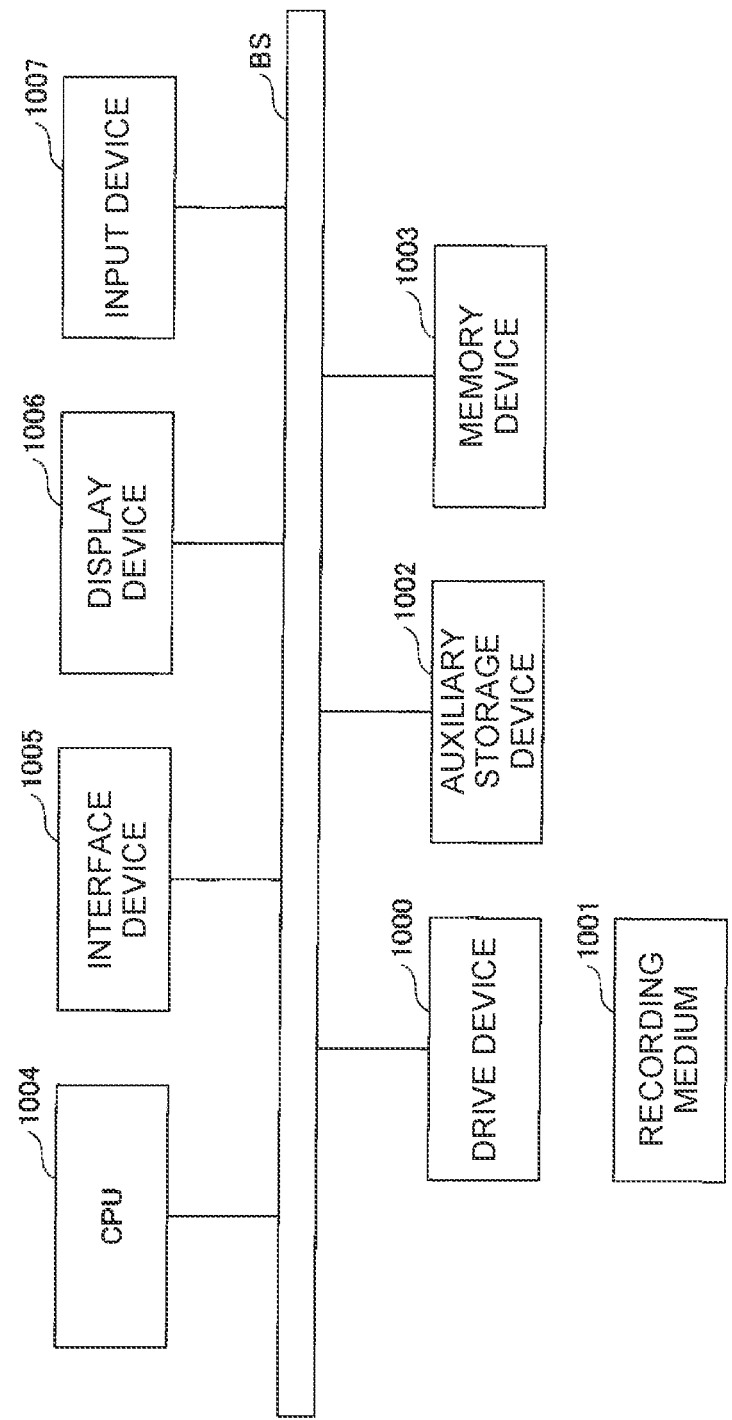
FIG. 14 is a diagram illustrating a hardware configuration example of a user terminal.

FIG. 14 is a diagram illustrating an example of a hardware configuration of a computer usable as the user terminal 50. The computer of FIG. 14 includes a drive device 1000, an auxiliary storage device 1002, a memory device 1003, a CPU 1004, an interface device 1005, a display device 1006, an input device 1007, and the like that are connected to one another by a bus B.

The program for realizing processing in the computer is provided by, for example, a recording medium 1001 such as a CD-ROM or a memory card. If the recording medium 1001 in which the program is stored is set to the drive device 1000, the program is installed from the recording medium 1001 into the auxiliary storage device 1002 via the drive device 1000. Note that, the program does not necessarily need to be installed from the recording medium 1001, and may be downloaded from another computer via the network. The auxiliary storage device 1002 stores the installed program therein, and also stores necessary files, data, and the like therein.

In the case where an instruction to activate the program is given, the memory device 1003 reads the program out of the auxiliary storage device 1002, and stores the program therein. The CPU 1004 realizes a function concerning the user terminal 50 according to the program stored in the memory device 1003. The interface device 1005 is used as an interface for connecting to the network. The display device 1006 displays a GUI (graphical user interface) and the like thereon according to the program. The input device 1007 includes a keyboard and a mouse, buttons, a touch panel, or the like, and is used to input various operation instructions.

Overview of Embodiment Mode

As described hereinabove, the present embodiment mode provides a technology that makes connection to a communication network and enables utilization of a communication service even at the time of power outage. The present embodiment mode provides at least the communication apparatuses according to the following items.

(Item 1)

A communication apparatus for making connection to a communication network, including:
an optical network unit; and
an external power supply input/output terminal,
the communication apparatus being configured such that electrical power is fed to the optical network unit from an external terminal that is connected to the external power supply input/output terminal and functions as an auxiliary power supply.

(Item 2)

The communication apparatus according to item 1, further including a home gateway, in which
in a case where the external terminal is connected to the external power supply input/output terminal, the optical network unit receives electrical power supply from the external terminal without performing communication with the home gateway.

(Item 3)

The communication apparatus according to item 1 or 2, in which
the external terminal is: a user terminal that executes a connection sequence for making connection to the communication network; or a wireless LAN router that performs wireless communication with the user terminal that executes the connection sequence for making connection to the communication network.

(Item 4)

The communication apparatus according to any one of items 1 to 3, including a storage device that stores an application therein, in which
the external terminal or the user terminal connected to the external terminal acquires the application from the storage device and executes the application, to thereby execute the connection sequence for making connection to the communication network.

(Item 5)

The communication apparatus according to any one of items 1 to 4, in which
in a case where power outage is detected or a case where it is detected that the external terminal is connected, the optical network unit executes a power-saving operation based on a cyclic sleep.

(Item 6)

The communication apparatus according to item 5, in which the optical network unit monitors an amount of charge of the auxiliary power supply, and controls the power-saving operation on a basis of the amount of charge.

(Item 7)

The communication apparatus according to any one of items 1 to 6, further including:
an optical/electrical power feed unit that converts light from an optical fiber connected to the optical network unit into electrical power;
an internal battery that accumulates therein the electrical power obtained from the optical/electrical power feed unit; and
means for monitoring an amount of charge of the internal battery, avoiding activating the optical network unit until a predetermined amount of electrical power is accumulated in the internal battery, and activating the optical network unit in a case where it is detected that the predetermined amount of electrical power is accumulated.

(Item 8)

The communication apparatus according to any one of items 1 to 7, further including means for monitoring a trigger of a communication start, avoiding activating the optical network unit until the trigger is detected, and activating the optical network unit in a case where the trigger is detected.

Although the present embodiment mode has been described hereinabove, the present invention is not limited to the particular embodiment mode, and can be variously modified and changed within the scope of the present invention described in Claims.

REFERENCE SIGNS LIST 10, 100, 200, 300 in-home communication apparatus
11, 120, 310 ONU
12, 351 broadband router
13, 352 telephone adapter
14, 353 wireless LAN adapter
15, 350 HGW
20, 370 AC adapter
30, 50 user terminal
40 analog telephone set
60 communication network
71 router and the like
72 OLT
73 emergency power generation facility
74 fuel tank
110, 330 storage device
130, 230, 320 DC power supply
140, 190, 240, 260, 360, 365 external power supply input/output terminal
150 internal battery
160 mobile wireless LAN router
170 optical/electrical power feed unit
180 mobile battery
210 small ONU
215 cage
220, 340 conversion unit
1000 drive device
1001 recording medium
1002 auxiliary storage device
1003 memory device
1004 CPU
1005 interface device
1006 display device
1007 input device

The invention claimed is:

1. A communication apparatus, including one or more computing devices, for making connection to a communication network, comprising:
an optical network unit;
an external power supply input/output terminal; and
a home gateway,
wherein the communication apparatus is configured to provide electrical power to the optical network unit from an external terminal that is connected to the external power supply input/output terminal and that functions as an auxiliary power supply, and
wherein, based on the external terminal being connected to the external power supply input/output terminal, the optical network unit receives the electrical power from the external terminal without performing communication with the home gateway.

2. The communication apparatus according to claim 1, wherein the external terminal is (i) a user terminal that executes a connection sequence for making connection to the communication network or (ii) a wireless local area network (LAN) router that performs wireless communication with the user terminal executing the connection sequence for making connection to the communication network.

3. The communication apparatus according to claim 1, further comprising a storage device that stores an application therein,
wherein the external terminal or a user terminal connected to the external terminal acquires the application from the storage device and executes the application, to thereby execute a connection sequence for making connection to the communication network.

4. The communication apparatus according to claim 1, wherein
based on power outage being detected or connection between the external terminal and the external power supply input/output terminal being detected, the optical network unit executes a power-saving operation based on a cyclic sleep.

5. The communication apparatus according to claim 4, wherein
the optical network unit monitors an amount of charge of the auxiliary power supply, and controls the power-saving operation on a basis of the amount of charge.

6. The communication apparatus according to claim 1, further comprising:
an optical/electrical power converter that converts light from an optical fiber connected to the optical network unit into electrical power;
an internal battery that accumulates therein the electrical power obtained from the optical/electrical power converter; and
one or more processor are configured to:
monitor an amount of charge of the internal battery,
delay activation of the optical network unit until a predetermined amount of electrical power is accumulated in the internal battery, and
activate the optical network unit in a case where it is detected that the predetermined amount of electrical power is accumulated.

7. The communication apparatus according to claim 1, further comprising one or more processors configured to:
monitor a trigger of a communication start,
delay activation of the optical network unit until the trigger is detected, and activate the optical network unit based on the trigger being detected.

\* \* \* \* \*